United States Patent
Patwardhan et al.

(10) Patent No.: US 12,549,507 B2
(45) Date of Patent: Feb. 10, 2026

(54) METHOD AND SYSTEM FOR EFFICIENT LAYER-2 FORWARDING BETWEEN VIRTUAL MACHINES

(71) Applicant: Nutanix, Inc., San Jose, CA (US)

(72) Inventors: Kedar Shrikrishna Patwardhan, Urbana, IL (US); Pratik Vijay Panjwani, San Jose, CA (US); Rutuja Umesh Madhure, Pune (IN); Sunil Khushal Patil, Pune (IN)

(73) Assignee: Nutanix, Inc., San Jose, CA (US)

( * ) Notice: Subject to any disclaimer, the term of this patent is extended or adjusted under 35 U.S.C. 154(b) by 79 days.

(21) Appl. No.: 18/415,373

(22) Filed: Jan. 17, 2024

(65) Prior Publication Data

US 2025/0141831 A1    May 1, 2025

(51) Int. Cl.
*H04L 61/103* (2022.01)
*H04L 61/5007* (2022.01)
*H04L 69/22* (2022.01)

(52) U.S. Cl.
CPC ........ *H04L 61/103* (2013.01); *H04L 61/5007* (2022.05); *H04L 69/22* (2013.01)

(58) Field of Classification Search
CPC .... H04L 61/103; H04L 61/5007; H04L 69/22
USPC ....................................................... 709/245
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,772,866 B1 | 9/2017 | Aron et al. |
| 2012/0177039 A1* | 7/2012 | Berman ................. H04L 45/74 370/428 |

(Continued)

FOREIGN PATENT DOCUMENTS

| | | | | |
|---|---|---|---|---|
| CN | 112953884 A | * | 6/2021 | ............. H04L 45/74 |
| WO | WO-2024140711 A1 | * | 7/2024 | |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Ruolei Zong
(74) *Attorney, Agent, or Firm* — Yao Legal Services, Inc.

(57) ABSTRACT

A computing system is provided that enables efficient layer-2 traffic forwarding. During operation, the computing system can determine that a packet is from a first virtual machine (VM) running on the computing system and destined to a second VM running on a second computing system. The computing system can determine a first transit Internet Protocol (IP) address of a first VM and a second transit IP address of the second VM. The computing system can then modify the packet to replace existing media access control (MAC) addresses in the layer-2 header with MAC addresses of the computing system and the second computing system. The computing system can also modify the packet to replace the source and destination IP addresses in the layer-3 header with the first and second transit IP addresses, respectively. Subsequently, the computing system can determine an egress port based on the modified layer-2 header.

20 Claims, 8 Drawing Sheets

(56) References Cited

U.S. PATENT DOCUMENTS

| | | | |
|---|---|---|---|
| 2021/0036889 A1* | 2/2021 | Jain | H04L 61/2535 |
| 2021/0360401 A1* | 11/2021 | Marinho | H04L 63/0823 |
| 2023/0179563 A1* | 6/2023 | Goodwin | H04L 61/2514 |
| | | | 709/245 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

Poitras, Steven. "The Nutanix Bible" (Jul. 25, 2019), from https://nutanixbible.com/ pp. all.

Poitras, Steven. "The Nutanix Bible" (Sep. 17, 2019), from https://nutanixbible.com/ pp. all.

Cano, Ignacio et al. "Curator: Self-Managing Storage for Enterprise Clusters"; University of Washington; published Mar. 2017; pp. all.

Poitras, Steven. "The Nutanix Bible" (Jan. 21, 2020), from https://nutanixbible.com/ pp. all.

Poitras, Steven. "The Nutanix Bible" (Sep. 14, 2020), from https://nutanixbible.com/ pp. all.

Poitras, Steven. "The Nutanix Bible" (Dec. 31, 2020), from https://nutanixbible.com/ pp. all.

Poitras, Steven. "The Nutanix Bible" (Jul. 27, 2022), from https://nutanixbible.com/ pp. all.

Poitras, Steven. "The Nutanix Bible" (Jan. 16, 2024), from https://nutanixbible.com/ pp. all.

Citrix XenDesktop 7.1 on Microsoft Hyper-V Server 2012 R2 on Nutanix Virtual Computing Platform, Solution Design, Jun. 25, 2014.

* cited by examiner

| VM 252 | VPC 254 | IP ADDR 256 | MAC ADDR 258 | HOST MAC ADDR 260 | TIPA 262 |
|---|---|---|---|---|---|
| VM 124 | VPC 112 | IP ADR 232 | MAC ADR 212 | MAC ADR 222 | TIPA 152 |
| VM 126 | VPC 114 | IP ADR 234 | MAC ADR 214 | MAC ADR 222 | TIPA 154 |
| VM 134 | VPC 114 | IP ADR 236 | MAC ADR 216 | MAC ADR 224 | TIPA 156 |
| VM 136 | VPC 112 | IP ADR 238 | MAC ADR 218 | MAC ADR 224 | TIPA 158 |

TRANSIT DATA STRUCTURE 140

FIG. 2B

METHOD AND SYSTEM FOR EFFICIENT LAYER-2 FORWARDING BETWEEN VIRTUAL MACHINES

RELATED APPLICATIONS

This application claims the benefit of Indian Provisional Application No. 202311073511, titled "Method and System for facilitating Efficient Overlay Networks," by inventors Kedar Shrikrishna Patwardhan, Pratik Vijay Panjwani, Rutuja Umesh Madhure, and Sunil Khushal Patil, filed 28 Oct. 2023, the disclosure of which is incorporated by reference herein.

BACKGROUND

Field

The present disclosure relates to a communication network. More specifically, the present disclosure relates to an overlay network architecture with efficient layer-2 data forwarding between virtual machines (VMs).

Related Art

As network traffic becomes more diverse, virtualization can be utilized to segment network and computing infrastructure efficiently. In particular, the evolution of virtual computing has made multi-tenancy attractive and, consequently, placed additional requirements on the network. For example, a large number of VMs can be allocated to a large number of tenants. It is often desirable that the network infrastructure can provide a large number of virtualized segments, such as virtual private clouds (VPCs), to support multi-tenancy and ensure network separation among the tenants. Typically, a respective VPC can be deployed on an overlay network.

Overlay networks have widely been used in various software-defined networking stacks in on-premise data centers as well as in public clouds. Overlay is a virtual or logical layer built on the underlay network. The constraints of the physical networking infrastructure do not bind these networks. Users have the flexibility to assign any Internet Protocol (IP) addresses to respective VMs based on their needs without having to update the physical network configuration. These IP addresses may not have a presence in the underlay network.

Typically, overlay networks use an encapsulation and decapsulation mechanism. A source VM on one of the hosts (e.g., a source host) can send a packet to a destination VM on a different host (e.g., a destination host) using IP addresses from the overlay network. Before sending the packet out of the source host, the packet can be encapsulated with an encapsulation header comprising the IP and media access control (MAC) addresses of the hosts. These addresses can be recognized by the underlay network. The encapsulated packet can then be forwarded to the destination host via the underlay network.

Upon receiving the encapsulated packet, the destination host can decapsulate the encapsulation header. To perform the decapsulation, the destination host can remove the encapsulation header and obtain the inner packet (i.e., the packet generated by the source VM). The destination host can then provide the packet to the destination VM. Thus, the underlay network may operate as a medium of transmission of packets between the VMs.

SUMMARY

One embodiment of the present invention provides a computing system that facilitates efficient layer-2 traffic forwarding. During operation, the computing system can determine that a packet is from a first VM running on the computing system and destined to a second VM running on a second computing system. The computing system can then determine a first transit Internet Protocol (IP) address of a first VM and a second transit IP address of the second VM. Here, a transit IP address of a respective VM is distinct from a primary IP address using which the VM participates in routing. The computing system can then modify a layer-2 header of the packet to replace source and destination MAC addresses in the layer-2 header with a first MAC address of the computing system and a second MAC address of the second computing system, respectively. The computing system can also modify the layer-3 header of the packet to replace the source and destination IP addresses in the layer-3 header of the packet with the first and second transit IP addresses, respectively. Subsequently, the computing system can determine an egress port corresponding to the second computing system based on the modified layer-2 header.

In a variation on this embodiment, the computing system can map the first transit IP address to the IP and MAC addresses of the first VM. Furthermore, the computing system can map the first transit IP address to the IP and MAC addresses of the first VM.

In a further variation, the first and second VMs can belong to a VPC. Furthermore, the IP addresses of the first and second VMs can be allocated from a first IP address space associated with the VPC.

In a further variation, the first and second transit IP addresses are allocated from a second IP address space spanning a respective VPC in the distributed system. The second IP address space is distinct from the first IP address space.

In a variation on this embodiment, the computing system and the second computing system can be in the same layer-2 forwarding domain.

In a variation on this embodiment, the computing system can receive, from a management device, one or more flow rules instructing the computing system to modify layer-2 and layer-3 headers of an inter-VM packet.

In a further variation, the computing system can receive, from the management device, information indicating the allocation of the first and second transit IP addresses to the first and second VMs, respectively.

In a variation on this embodiment, the computing system can receive an ARP request for an IP address of the second VM. The computing system can generate an ARP response comprising a MAC address of the second VM from within the computing system. The computing system can then provide the ARP response to the first VM.

Another embodiment of the present invention provides a computing system that facilitates efficient layer-2 traffic forwarding. The computing system can run a first VM. During operation, the computing system can determine that a packet is received from a second VM running on a second computing system. The computing system can obtain a first transit IP address of the first VM and a second transit IP address of the second VM from a layer-3 header of the packet. A transit IP address of a respective VM is distinct from a primary IP address using which the VM participates in routing. The computing system can obtain a first primary IP address and a first MAC address of the first VM based on the first transit IP address. Similarly, the computing system can obtain a second primary IP address and a second MAC address of the second VM based on the second transit IP address. The computing system can then modify the packet to replace destination and source MAC addresses in a layer-2 header with the first and second MAC addresses, respectively. The computing system can also modify the packet to replace destination and source IP addresses in the layer-3 header with the first and second primary IP addresses, respectively. Subsequently, the computing system can provide the modified packet to the second VM.

BRIEF DESCRIPTION OF THE FIGURES

FIG. 2B illustrates an exemplary transit mapping table for facilitating efficient layer-2 forwarding of inter-VM traffic, in accordance with an embodiment of the present application.

In the figures, like reference numerals refer to the same figure elements.

DETAILED DESCRIPTION

Figure 1:
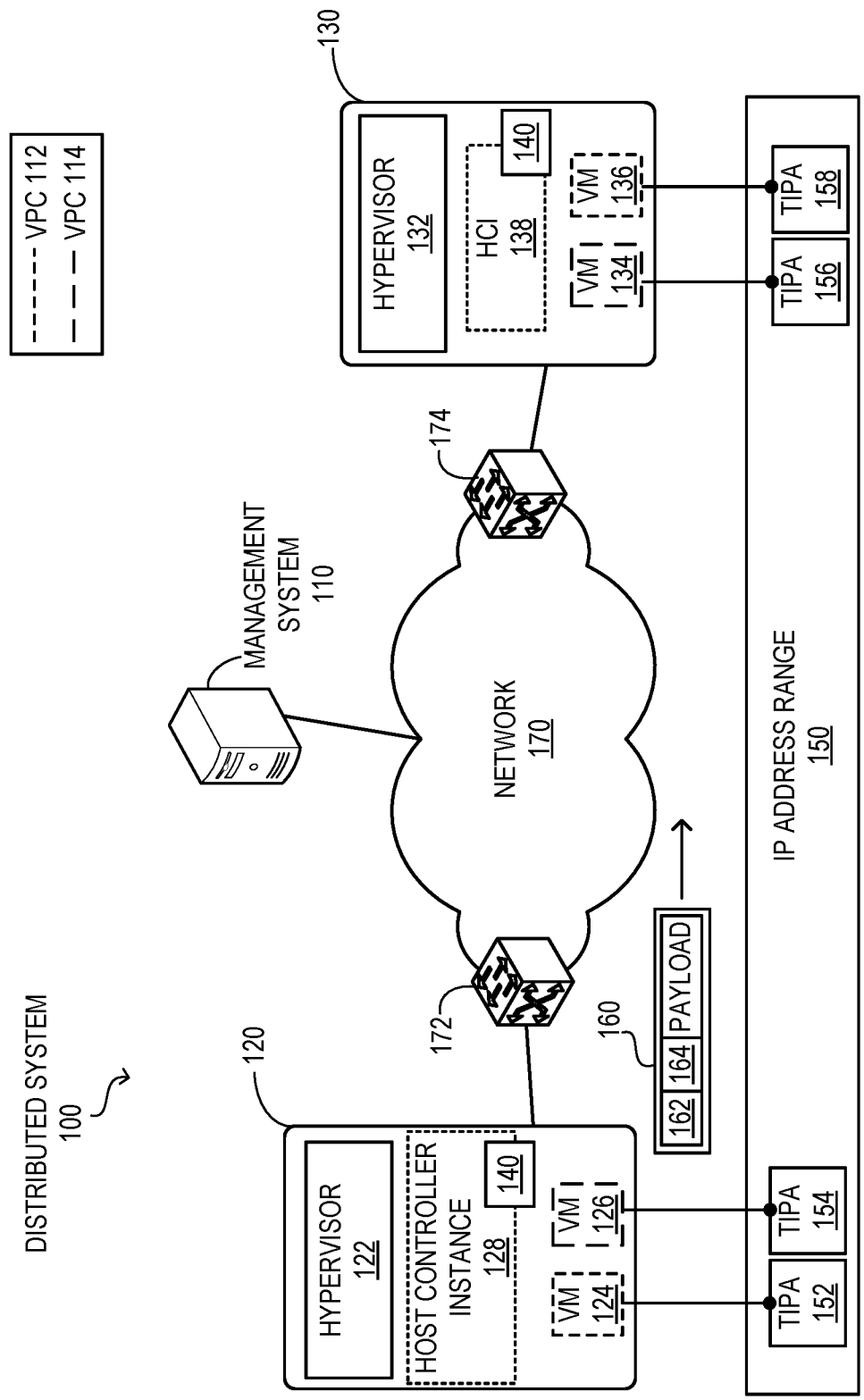
FIG. 1 illustrates an exemplary infrastructure that supports efficient layer-2 forwarding of inter-VM traffic based on transit IP addresses, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments described herein solve the problem of efficiently forwarding inter-VM traffic in an overlay network by (i) replacing the source and destination IP addresses of an inter-VM packet with corresponding transit IP addresses allocated to the source and destination VMs, respectively, (ii) replacing the source and destination MAC addresses of the packet with corresponding host MAC addresses for forwarding an inter-VM packet, and (iii) reconstructing the packet at the destination host based on the transit IP address. Here, the transit IP address may not be used to forward traffic. Instead, it can be used to retrieve information associated with the VMs, which allows the host to modify the packet at the source host and reconstruct the packet at the destination host. Because the host MAC addresses are recognized by the underlay network, the packet can be forwarded to the destination host based on layer-2 forwarding without relying on an encapsulation header.

With existing technologies, one or more VMs can run on a hypervisor on a host (e.g., a server). The host can be a computing system deployed in a distributed system. The distributed system can include a number of computing devices (e.g., hosts) and a network coupling the computing devices. A management system (e.g., a controller of a software-defined network (SDN)) can manage and provision the hosts and the network. A respective host of the distributed system can also deploy a host controller instance (HCI) that provides a set of services to the host (e.g., storage and input/output (I/O)). In some embodiments, the HCI can be a VM running on the hypervisor. The HCI of the host can operate as an extension of the management system on the host. The HCI can then program a set of flow rules received from the management system on the host.

When a VM sends a packet to another VM, a virtual switch of the hypervisor of the host can forward the packet to another hypervisor via a switch (e.g., a Top-of-Rack (ToR) switch) of the network. These VMs can belong to different VPCs, each of which can operate as a virtualized cloud infrastructure (e.g., contained within the distributed system). A set of the resources available in the distributed system can be logically isolated and allocated to an individual tenant. Here, the computing, storage, networking, and software resources can be segmented and allocated to corresponding VPCs. Consequently, the infrastructure segments and their operations of the VPCs can be separated among individual tenants.

The scope of the IP address space for a respective VPC can be restricted within the VPC. In other words, an IP address from the IP address space can be allocated to a VM deployed on that particular VPC. As a result, the same set of IP addresses can be concurrently used by multiple VPCs. Typically, the IP address space of a VPC can be a private IP space (e.g., accessible based on Network address translation (NAT)). Consequently, the IP addresses associated with a VPC may not be used by the switches in the underlay network for routing. To ensure packet forwarding among hosts, the hosts can operate as tunnel endpoints in an overlay network where the packet can be encapsulated with a tunnel encapsulation header. The tunnel can be established based on a tunneling protocol. Examples of a tunneling protocol can include, but are not limited to, virtual extensible local area network (VXLAN), generic routing encapsulation (GRE), network virtualization using GRE (NVGRE), layer-2 tunneling protocol (L2TP), multi-protocol label switching (MPLS), secure socket tunneling protocol (SSTP), Generic Networking Virtualization Encapsulation (Geneve), and Internet Protocol Security (IPsec).

When the source VM generates the packet, the IP addresses of the packet may not be usable for forwarding via the underlay network. Furthermore, the MAC addresses of the VMs can be virtual MAC addresses, which may be reused across VPCs. Because of the lack of uniqueness, the MAC addresses of the VMs may not be usable for forwarding in the underlay network. Therefore, the source host (e.g., the hypervisor on the source host) can encapsulate the packet with the encapsulation header. The encapsulation header can include the IP addresses of the source and destination hosts as source and destination addresses, respectively. These IP addresses can be public IP addresses recognized by the underlying network. Therefore, the encapsulated packet can be forwarded between the hosts based on the source and destination addresses in the encapsulated header.

The destination host can decapsulate the encapsulation header to obtain the inner packet and provide the packet to the destination VM. Therefore, the physical underlay network may operate as a medium of packet transmission while the overlay network is facilitated by the hosts. However, the overhead association with encapsulation and decapsulation operations can adversely impact the network performance (e.g., latency and throughput) of the overlay network. Furthermore, these operations utilize the computational resources of the hosts and, hence, reduce the computational resources available to the VMs executing on the hosts.

To solve this problem, a respective VM deployed on a distributed system can be allocated with a transit IP address that is used to identify information associated with the VM. A predetermined range of IP addresses can be pre-allocated as transit IP addresses. The management system of the distributed system can allocate the transit IP address to the VM from the available addresses in the range of IP addresses based on an allocation policy (e.g., random, sequential, or circular allocation). The management system can then notify a respective HCI regarding the allocation. The management system can also maintain information associated with the VM. The information can include, but is not limited to, a VM identifier identifying the VM, a VPC identifier, IP and MAC addresses of the VM, and the MAC address of the host of the VM. The management system can provide this information to a respective HCI. The HCI can store the information in association with the transit IP address in a transit data structure (e.g., in the memory of the host).

The management system can provide one or more flow rules to replace (or overwrite) the MAC and IP addresses of a respective inter-VM packet transmitted via the underlay network. Based on the rules, instead of encapsulating a packet from a source VM, when the source host receives an inter-VM packet from a local VM, the source host can modify the packet by replacing the source and destination MAC addresses of the layer-2 header of the packet with the MAC addresses of the source and destination hosts, respectively. A respective switch in the underlay network can belong to the same layer-2 forwarding domain. For example, a respective switch in the underlay network may operate without a virtual local area network (VLAN), or all switches in the underlay network may be configured with the same VLAN. Furthermore, these switches can also belong to the same subnet. Consequently, the packet can be forwarded from the source host to the destination host based on layer-2 forwarding via the forwarding domain of the underlay network.

Based on the flow rules, the source host can also modify the packet by replacing the source and destination IP addresses of the layer-3 header of the packet with the transit IP addresses of the source and destination VMs, respectively. Because the packet can be forwarded based on the layer-2 header of the packet, the transit IP addresses in the packet in the modified layer-3 header may not be used to forward the packet. Nonetheless, the transit IP addresses in the layer-3 header allow the destination host to reconstruct the packet. Upon receiving the packet from the underlay network, the destination host can determine that the destination address in the layer-2 header matches the local MAC address. Accordingly, the destination host can terminate the layer-2 forwarding.

The management system can also provide one or more rules to replace (or overwrite) the host MAC addresses and transit IP addresses of the packet with the corresponding addresses of the source and destination VMs at the destination host. Based on these flow rules, the destination host can obtain the transit IP addresses from the layer-3 header and look up the transit IP addresses in the transit data structure to obtain information associated with the source and destination VMs. Hence, the transit IP addresses are used to identify information associated with corresponding VMs without being used for forwarding. The destination host can then replace the source and destination IP addresses of the layer-3 header of the packet with IP addresses of source and destination VMs, respectively, based on the obtained information.

Similarly, the destination host can then replace the source and destination MAC addresses of the layer-2 header of the packet with MAC addresses of source and destination VMs, respectively, based on the obtained information. If the layer-2 header is removed when the layer-2 forwarding is terminated, the destination host can generate a new layer-2 header for the packet with MAC addresses of source and destination VMs. The destination host can reconstruct the packet with the original source and destination MAC and IP addresses. The destination host can then identify the destination VM based on the destination MAC address and provide the reconstructed packet to the destination VM. In this way, inter-VM traffic can be forwarded efficiently via the underlay network based on layer-2 forwarding without relying on tunnel encapsulation.

In this disclosure, the term "packet" refers to a group of bits that can be transported together across a network. "Packet" should not be interpreted as limiting embodiments of the present invention to any networking layer. "Packet" can be replaced by other terminologies referring to a group of bits, such as "message," "frame," "cell," or "datagram."

The term "switch" is used in a generic sense, and it can refer to any standalone or fabric switch operating in any network layer. "Switch" should not be interpreted as limiting embodiments of the present invention to layer-2 networks. Any physical or virtual device (e.g., a virtual machine, which can be a virtual switch operating on a computing device) that can forward traffic to an end device can be referred to as a "switch." Examples of such a device include, but are not limited to, a layer-2 switch, a layer-3 router, or an RBridge.

Network Architecture

FIG. 1 illustrates an exemplary infrastructure that supports efficient layer-2 forwarding of inter-VM traffic based on transit IP addresses, in accordance with an embodiment of the present application. As illustrated in FIG. 1, a distributed system 100 (e.g., a public cloud) can include a network 170 comprising switches 172 and 174. In some embodiments, one or more switches in network 170 can be virtual switches (e.g., a software switch running on a computing device). Switches 172 and 174 can be coupled to host devices (or hosts) 120 and 130, respectively. Hosts 120 and 130 can include hypervisors 122 and 132, respectively. VMs 124 and 126 can run on hypervisor 122, and VMs 134 and 136 can run on hypervisor 132.

In some embodiments, the hypervisors and VMs are configured, managed, and deployed from a management system 110. Management system 110 can be a controller of an SDN. Management system 110 can also be a virtualization manager. Examples of a virtualization manager include, but are not limited to, VMWare vCenter, Citrix XenCenter, and Microsoft Virtual Machine Manager. Management system 110 can have a view of the entire distributed system 100 (e.g., the network topology of network 170 and connectivity information of hosts 120 and 130). Management system 110 can also provide flow rules that define how packets received at hosts 120 and 130 can be forwarded. Management system 110 can then provide the flow rules to HCIs 128 and 138 on hosts 120 and 130, respectively.

In some embodiments, HCIs 128 and 138 can be VMs running on hypervisors 122 and 132, respectively. HCIs 128 and 138 can program a set of flow rules received from management system 110 on hosts 120 and 130, respectively. In this example, VMs 124 and 136 can belong to VPC 112. On the other hand, VMs 126 and 124 can belong to VPC 114. VPCs 112 and 114 may be associated with different tenants. For tenant isolation, routing and forwarding operations of VPCs 112 and 114 can operate independently of each other. Each of VPCs 112 and 114 can be associated with its own independent IP address space.

Therefore, the scope of the IP address space for VPC 112 can be restricted within that VPC 112. Similarly, the scope of the IP address space for VPC 114 can be restricted within that VPC 114. Therefore, the IP addresses allocated to VMs 124 and 136 of VPC 112 can be reallocated to VMs 126 and 134 of VPC 114. In other words, the same set of IP addresses can be concurrently used by VPCs 112 and 114. For example, VPCs 112 and 114 can both have a subnet A.B.C.0/24 (e.g., based on Classless Inter-Domain Routing (CIDR)). However, the corresponding IP address spaces can be isolated and restricted within corresponding VPCs.

Typically, the respective IP address spaces of VPCs 112 and 114 can be private IP spaces (e.g., accessible based on NAT). Consequently, the IP addresses associated with VPCs 112 and 114 may not be used by switches 172 and 174 in network 170 for routing. To ensure packet forwarding among hosts, hosts 120 and 130 can operate as tunnel endpoints in an overlay network where the packet can be encapsulated with a tunnel encapsulation header. Network 170 can then operate as the underlay network that facilitates the tunnels of the overlay network. The tunnel can be established based on a tunneling protocol, such as VXLAN, GRE, NVGRE, L2TP, MPLS, SSTP, Geneve, and IPsec.

If VM 124 sends a packet 160 to VM 136, the IP addresses of packet 160 may be from the IP address space of VPC 112. Furthermore, the MAC addresses of VMs 124 and 126 can be virtual MAC addresses, which may be reused across VPCs. Because of the lack of uniqueness, the MAC and IP addresses of VMs 124 and 126 may not be usable for forwarding in the underlay network. Accordingly, host 120 (e.g., at hypervisor 122) can encapsulate packet 160 with an encapsulation header. The encapsulation header can include the IP addresses of hosts 120 and 130 as source and destination addresses, respectively. These IP addresses can be public IP addresses recognized by network 170. Therefore, the encapsulated packet can be forwarded from host 120 to host 130 via a tunnel through network 170 based on the source and destination addresses in the encapsulated header. To do so, host 120 can determine the egress port corresponding to host 130.

Upon receiving encapsulated packet 160, host 130 can decapsulate the encapsulation header to obtain inner packet 160 and provide packet 160 to VM 136. Therefore, network 170 may operate as a medium of packet transmission while the overlay network is established at hosts 120 and 130. However, the overhead association with encapsulation and decapsulation operations can adversely impact the network performance (e.g., latency and throughput) of the overlay network. Furthermore, these operations utilize the computational resources of hosts 120 and 130 and, hence, reduce the computational resources available to the VMs executing on hosts 120 and 130.

To solve this problem, an IP address range 150 can be pre-allocated for transit IP addresses. IP address range 150 can include a range of IP addresses (e.g., defined by a subnet indicated by CIDR) allocated to VMs and used to identify the source and destination VMs in an inter-VM packet. VMs 124, 126, 134, and 136 can be allocated with transit IP addresses 152, 154, 156, and 158, respectively. Management system 110 can allocate the transit IP addresses from IP address range 150 based on an allocation policy (e.g., random, sequential, or circular allocation). Management system 110 can then notify HCIs 128 and 138 regarding the allocation. Therefore, both hosts 120 and 130 can maintain the allocation information, which can include the mapping between a VM and the corresponding transit IP address.

Because management system 110 can have a view of the entire distributed system, management system 110 can also maintain information associated with VMs 124, 126, 134, and 136. For example, the information associated with VM 124 can include, but is not limited to, a VM identifier identifying VM 124, a VPC identifier identifying VPC 112, the IP and MAC addresses of VM 124, and the MAC address of host 120. Management system 110 can provide this information to HCIs 128 and 138. HCIs 128 and 138 can store the information in association with transit IP address 152 in instances of a transit data structure 140 in hosts 120 and 130, respectively. In some embodiments, transit data structure 140 is maintained by HCIs 128 and 138. Similarly, management system 110 can provide information associated with VMs 126, 134, and 136 to HCIs 128 and 138. The obtained information is also stored in the respective instances of transit data structure 140.

Management system 110 can provide a first set of flow rules for source hosts to replace (or overwrite) the MAC and IP addresses of a respective inter-VM packet transmitted via network 170. HCIs 128 and 138 can program these flow rules on hosts 120 and 130, respectively. Based on the first set of flow rules, instead of encapsulating packet 160 from VM 124, host 120 can modify packet 160 by replacing the source and destination MAC addresses of layer-2 header 162 of packet 160 with the MAC addresses of hosts 120 and 130, respectively. Switches in network 170, such as switches 172 and 174, can belong to the same layer-2 forwarding domain. For example, switches in network 170 may operate without a VLAN or belong to the same VLAN. Furthermore, switches in network 170 may belong to the same subnet. Consequently, modified packet 160 can be forwarded from host 120 to host 130 based on the updated layer-2 header 162 via network 170.

Based on the first set of flow rules, host 120 can further modify packet 160 by replacing the source and destination IP addresses of layer-3 header 164 of packet 160 with transit IP addresses 152 and 158 of VMs 124 and 136, respectively. Because modified packet 160 can be forwarded based on modified layer-2 header 162 of packet 160, transit IP addresses in modified layer-3 header 164 may not be used to forward modified packet 160 to host 130. Nonetheless, transit IP addresses 152 and 158 in modified layer-3 header 164 allow host 130 to reconstruct original packet 160. Upon receiving modified packet 160 from switch 174, host 130 can determine that the destination address in modified layer-2 header 162 matches the local MAC address (i.e., the MAC address of host 130). Accordingly, host 130 can terminate the layer-2 forwarding of modified packet 160.

Management system 110 can also provide a second set of flow rules for destination hosts to replace (or overwrite) the host MAC addresses and transit IP addresses of a respective inter-VM packet with the corresponding addresses of the source and destination VMs. HCIs 128 and 138 can program these flow rules on hosts 120 and 130, respectively. Upon receiving modified packet 160, host 130 can obtain transit IP addresses 152 and 158 from modified layer-3 header 164. Host 130 can then look up transit IP addresses 152 and 158 in transit data structure 140 to obtain information associated with VMs 124 and 136, respectively. Hence, the transit IP addresses 152 and 158 can be used to identify information associated with VMs 124 and 136, respectively, without being used for forwarding via network 170. Based on the second set of flow rules and the obtained information, host 130 can replace the source and destination IP addresses of modified layer-3 header 164 with IP addresses of VMs 124 and 136, respectively.

Similarly, host 130 can replace the source and destination MAC addresses of modified layer-2 header 162 with the MAC addresses of VMs 124 and 136, respectively, as indicated in the information obtained from transit data structure 140. If modified layer-2 header 162 is removed when the layer-2 forwarding is terminated, host 130 can generate a new layer-2 header for packet 160 with MAC addresses of VMs 124 and 136. Host 130 thus can reconstruct packet 160 with the original source and destination MAC and IP addresses. Host 130 can then identify VM 136 as the destination VM and provide packet 160 to VM 136. In this way, inter-VM traffic can be forwarded efficiently via network 170 based on layer-2 forwarding without relying on tunnel encapsulation.

Layer-2 Inter-VM Traffic Forwarding

Figure 2A:
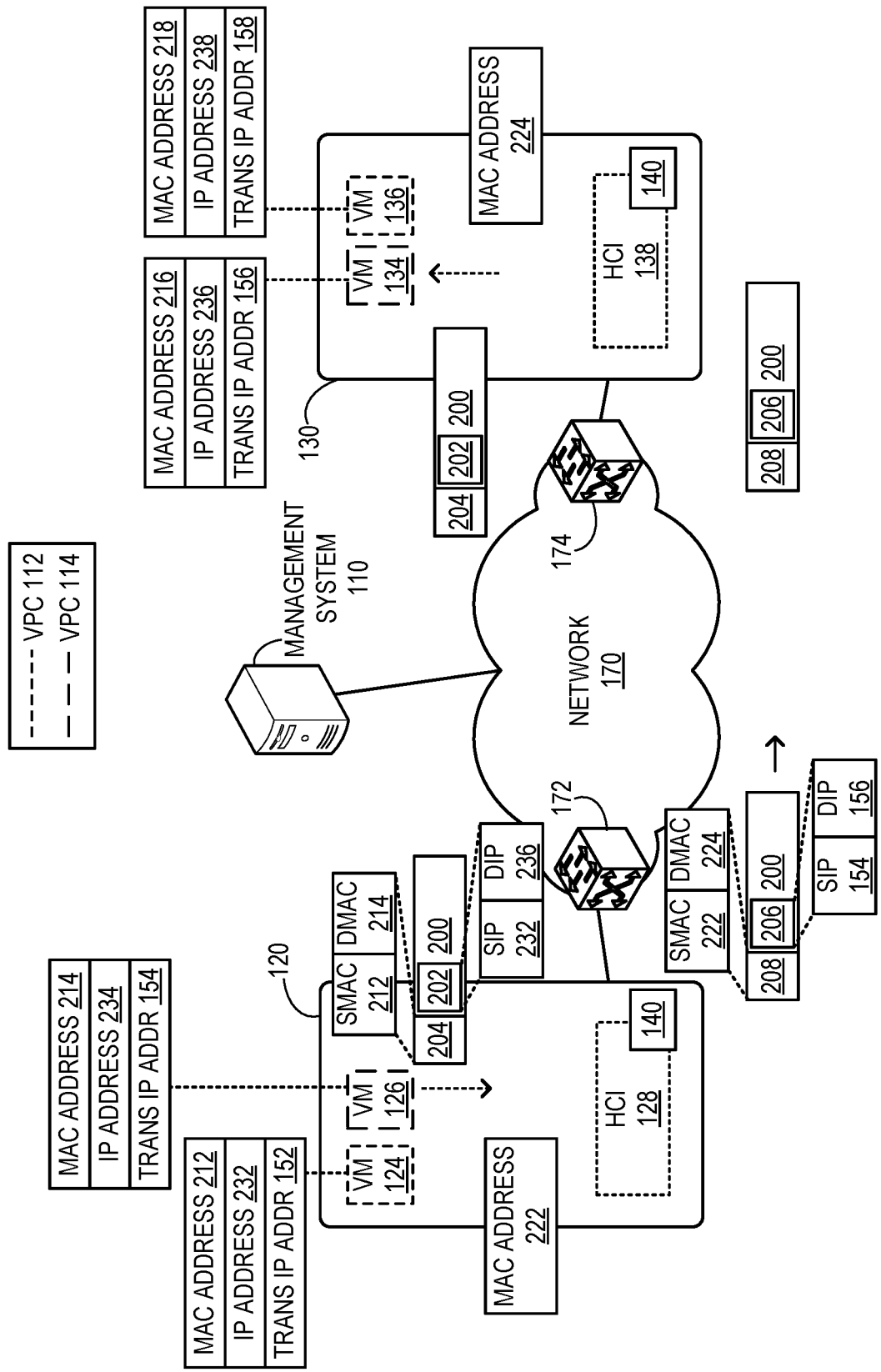
FIG. 2A illustrates exemplary efficient layer-2 forwarding of inter-VM traffic based on transit IP addresses, in accordance with an embodiment of the present application.

FIG. 2A illustrates exemplary efficient layer-2 forwarding of inter-VM traffic based on transit IP addresses, in accordance with an embodiment of the present application. VMs 124, 126, 134, and 136 can be associated with MAC addresses 212, 214, 216, and 218, respectively, and IP addresses 232, 234, 236, and 238, respectively. MAC addresses of hosts 120 and 130 can be 222 and 224, respectively. An administrator of VPC 112 can allocate IP addresses 212 and 218 to VMs 124 and 136. The allocation can be based on a dynamic host configuration protocol (DHCP) where the IP address space of VPC 112 can be defined in a DHCP server. IP addresses 212 and 218 can then be allocated to VMs 124 and 136, respectively, from the DHCP server. Similarly, IP addresses 214 and 216 can be allocated from the IP address space of VPC 114. IP addresses 212, 214, 216, and 218 can be the primary IP addresses of VMs 124, 126, 134, and 136, respectively, because these IP addresses can be used to determine routes in corresponding VPC. In other words, VMs 124, 126, 134, and 136 can participate in a routing protocol (e.g., border gateway protocol (BGP)) deployed on corresponding VPCs using their respective primary IP addresses.

Management system 110 can allocate transit IP addresses 152, 154, 156, and 158 to VMs 124, 126, 132, and 136, respectively. This allocation is independent of the allocations in VPCs 112 and 114. A respective transit IP address can be unique and identify the corresponding VM in distributed system 100. Because the IP address spaces of VPCs 112 and 114 can be independent, the same IP address can be allocated to VMs of VPCs 112 and 114. For example, IP addresses 232 and 234 can be the same IP address obtained from the IP address spaces of VPCs 112 and 114, respectively. As a result, IP addresses 232 and 234 may not uniquely identify VMs 124 and 126, respectively, in distributed system 100. In contrast, transit IP addresses 152 and 154 can be non-overlapping and can uniquely identify VMs 124 and 126, respectively, in distributed system 100. Hosts 120 and 130 can utilize this feature of transit IP addresses to facilitate efficient layer-2 forwarding of inter-VM packets.

Furthermore, to bypass tunnel encapsulation in network 170, HCIs 128 and 138 can facilitate local resolution for address resolution protocol (ARP) requests. HCI 128 can program respective flow rules for ARP resolution for IP addresses 236 and 238 on host 120. Similarly, HCI 138 can program respective flow rules for ARP resolution for IP addresses 232 and 234 on host 130. As a result, if VM 126 issues an ARP request for IP address 236 of VM 134, the ARP request can be intercepted at host 120. A proxy ARP response comprising MAC address 216 can then be provided to VM 126 within host 120 without sending the ARP request to VM 134. For example, on host 120, a flow rule can indicate that if an ARP request's target IP address includes IP address 236, a proxy ARP response comprising IP address 236 and MAC address 216 should be sent back to the requesting VM. Based on this flow rule, VM 126 can receive the ARP response from within host 120.

Once VM 126 learns MAC address 216, VM 126 can send a packet 200 to VM 134. The source and destination addresses of packet 200 can correspond to VMs 126 and 134, respectively. For example, the source and destination IP addresses of a layer-3 header 202 (e.g., an IP header) can be IP addresses 232 and 234, respectively. Furthermore, the source and destination MAC addresses of a layer-2 header 204 (e.g., an Ethernet header) of packet 200 can be MAC addresses 212 and 214, respectively. When host 120 receives packet 200 for forwarding, packet 200 can match a set of flow rules for modifying inter-VM packets.

Accordingly, instead of encapsulating packet 200, host 120 can modify layer-2 header 204 of packet 200 to generate modified layer-2 header 208 of packet 200. Similarly, host 120 can modify layer-3 header 202 of packet 200 to generate modified layer-3 header 206 of packet 200. Host 120 can generate header 208 by replacing the source and destination MAC addresses of header 204 (i.e., MAC addresses 212 and 214) with MAC addresses 222 and 224 of hosts 120 and 130, respectively. Furthermore, host 120 can generate header 206 by replacing source and destination IP addresses (i.e., IP addresses 232 and 236) of header 202 with transit IP addresses 154 and 156 of VMs 126 and 134, respectively. MAC addresses 222 and 224 can be recognized by the switches in network 170, the switches in network 170 can send modified packet 200 to host 130 based on header 208 via the forwarding domain of network 170. Here, transit IP addresses 154 and 156 in header 206 may not be used to forward modified packet 200 to host 130.

Transit IP addresses 154 and 156 in header 206 can allow host 130 to reconstruct original packet 200. Upon receiving modified packet 200 from switch 174, host 130 can obtain transit IP addresses 154 and 156 from header 206. Host 130 can then look up transit IP addresses 154 and 156 in transit data structure 140 to obtain information associated with VMs 126 and 134, respectively. Based on the information in transit data structure 140, host 130 can replace IP addresses 154 and 156 in header 206 with IP addresses 232 and 236, respectively, to regenerate header 202. Moreover, host 130 can replace MAC addresses 222 and 224 in header 204 with MAC addresses 212 and 214, respectively, to regenerate header 204. In this way, host 130 can reconstruct packet 200 and provide it to VM 134.

FIG. 2B illustrates an exemplary transit mapping table for facilitating efficient layer-2 forwarding of inter-VM traffic, in accordance with an embodiment of the present application. Transit mapping table 140 can maintain information associated with a respective VM of a distributed system in association with transit IP address 262. Therefore, transit IP address 262 can be mapped to the information of the VM. The information can include, but is not limited to, a VM identifier 252, a VPC identifier 254, an IP address 256 of the VM, a MAC address 258 of the VM, and host MAC address 260.

For example, VM 124 can be associated with transit IP address 152. Accordingly, transit data structure 140 can include an entry that maps VM 124, VPC 112, IP address 232, MAC address 212, and host MAC address 222 to transit IP address 152. As a result, by looking up transit IP address 152 in transit data structure 140, a host can obtain the information associated with VM 152. As described in conjunction with FIG. 2A, transit data structure 140 can include an entry that maps VM 126, VPC 114, IP address 234, MAC address 214, and host MAC address 222 to transit IP address 154. Transit data structure 140 can also include an entry that maps VM 134, VPC 114, IP address 236, MAC address 216, and host MAC address 224 to transit IP address 156; and another entry that maps VM 136, VPC 112, IP address 238, MAC address 218, and host MAC address 224 to transit IP address 158.

Operations

Figure 3:
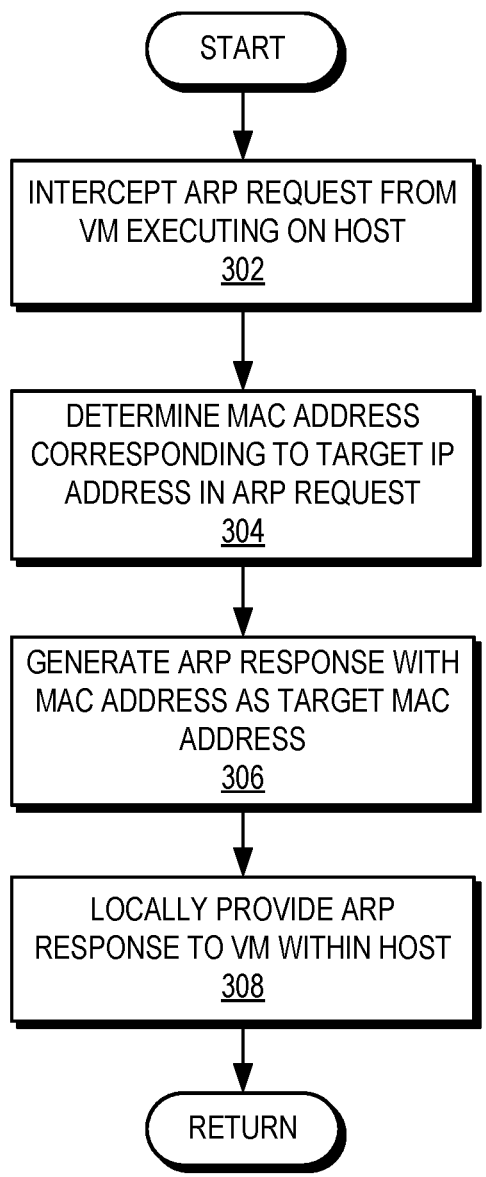
FIG. 3 presents a flowchart illustrating a method of a host responding to an address resolution protocol (ARP) request from a VM executing on the host, in accordance with an embodiment of the present application.

FIG. 3 presents a flowchart illustrating a method of a host responding to an ARP request from a VM executing on the host, in accordance with an embodiment of the present application. During operation, the host can intercept an ARP request from a VM executing on the host (operation 302). The host can intercept the ARP request based on a flow rule programmed on the host. The flow rule can indicate that an ARP request directed to a remote VM (i.e., on a different VM) should be responded to locally by the host. Accordingly, the host can determine the MAC address corresponding to the target IP address in the ARP request (operation 304). The MAC address can be specified by the flow rule or can be determined by looking up the target IP address in the transit data structure. The host can then generate an ARP response with the MAC address as the target MAC address (operation 306) and locally provide the ARP response to the VM within the host (operation 308).

Figure 4A:
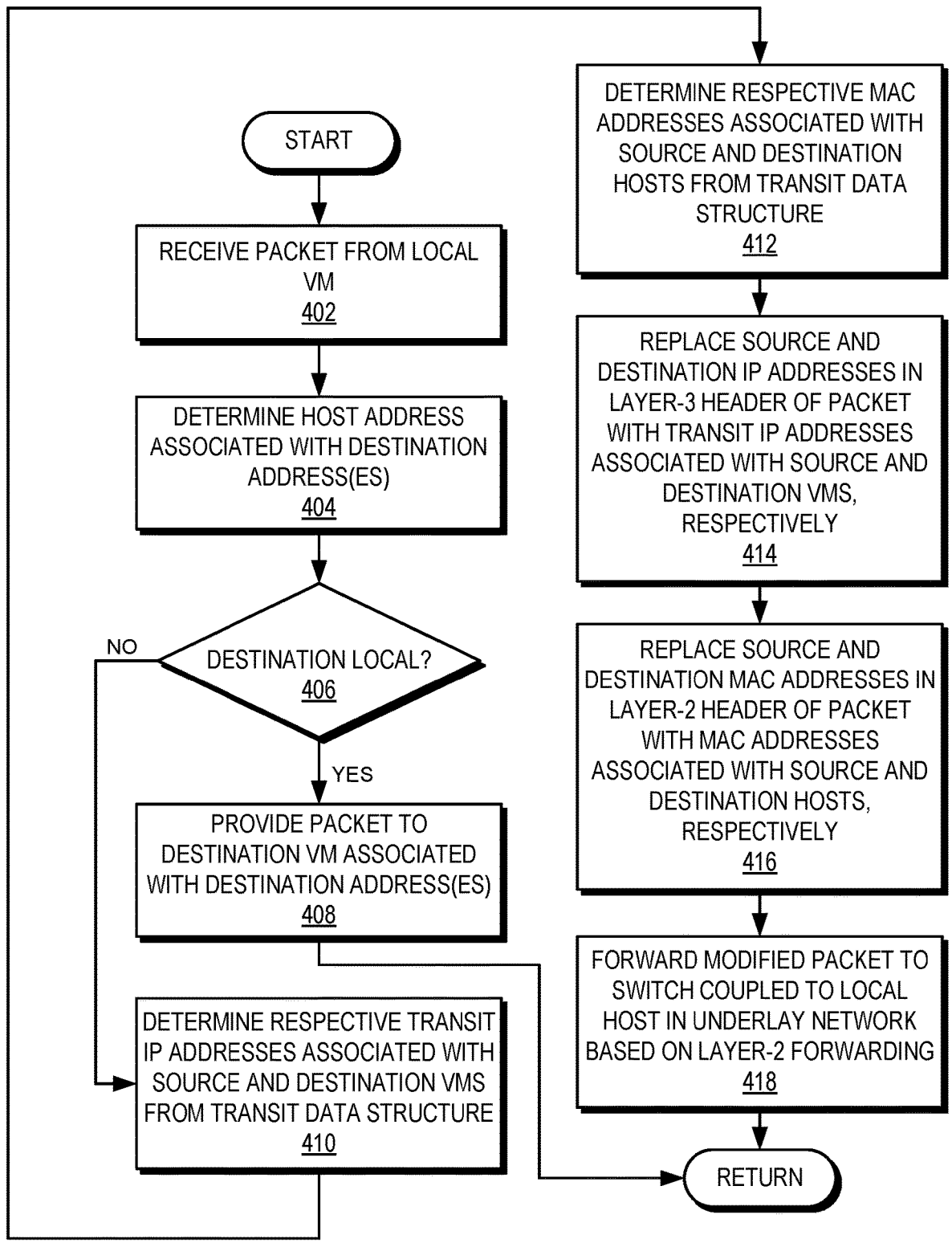
FIG. 4A presents a flowchart illustrating a method of a host forwarding an inter-VM packet to a remote host, in accordance with an embodiment of the present application.

FIG. 4A presents a flowchart illustrating a method of a host forwarding an inter-VM packet to a remote host, in accordance with an embodiment of the present application. During operation, the host can receive a packet from a local VM (operation 402). The host can determine the host address (e.g., a MAC address) associated with the destination address(es) (operation 404). The destination addresses can include the destination MAC and IP addresses of the packet. Since a transit data structure can indicate which VM is executing on which host, the host may determine the host address accordingly.

The host can then determine whether the destination is local (i.e., the host address belongs to the local host) (operation 406). If the destination is local, the destination VM can execute on the local host. The host can then provide the packet to the destination VM associated with the destination addresses (operation 408). On the other hand, if the destination is not local, the host can determine respective transit IP addresses associated with the source and destination VMs from the transit data structure (operation 410).

The host can also determine respective MAC addresses associated with the source and destination hosts from the transit data structure (operation 412). The host can then replace the source and destination IP addresses in the layer-3 header of the packet with transit IP addresses associated with source and destination VMs, respectively (operation 414). The host can also replace the source and destination MAC addresses in the layer-2 header of the packet with MAC addresses associated with source and destination hosts, respectively (operation 416). The host can then forward the modified packet to a switch coupled to the local host (i.e., a switch in the underlay network) based on layer-2 forwarding (operation 418). In this way, the packet can be forwarded to the destination host without encapsulating the packet with a tunnel encapsulation header.

Figure 4B:
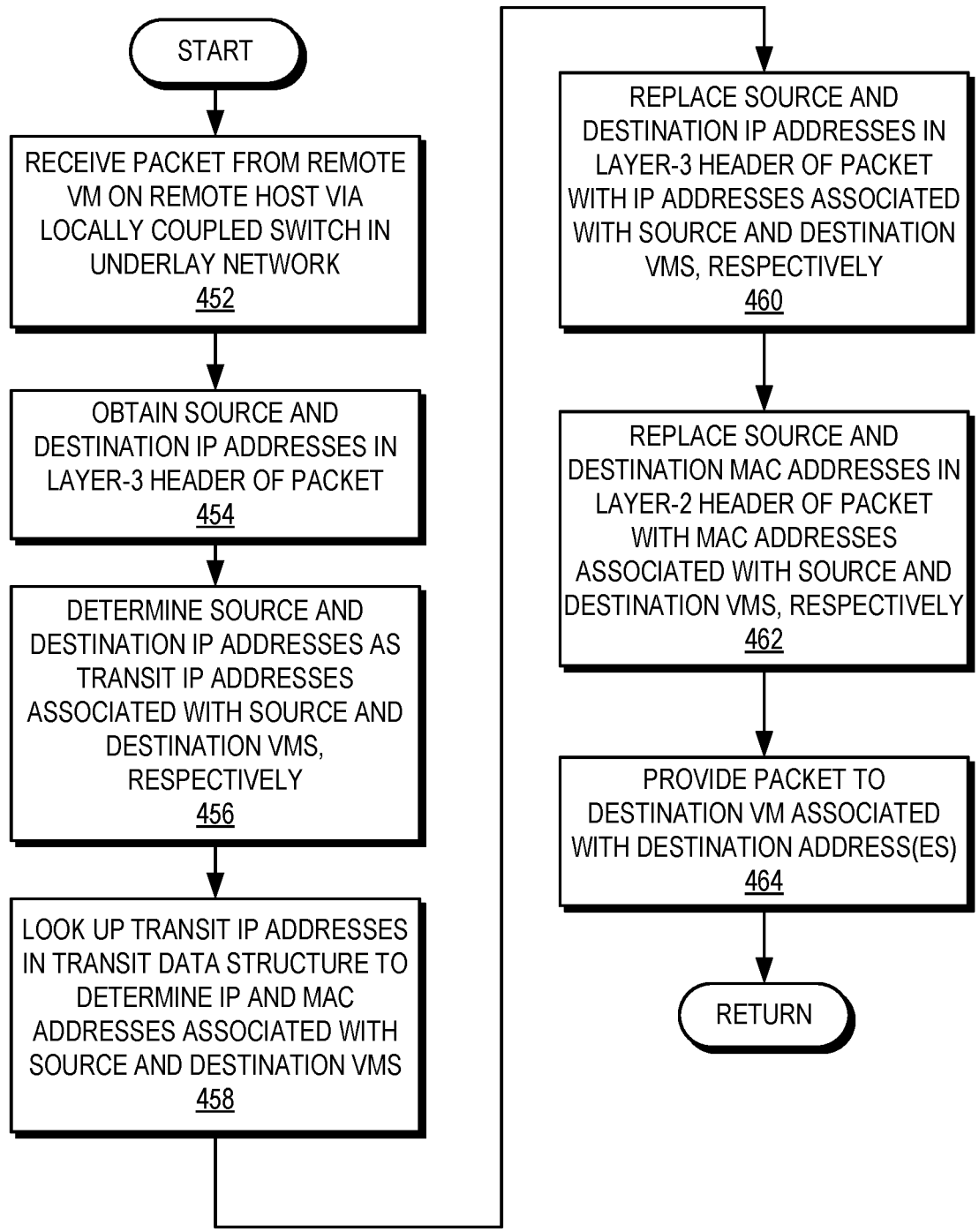
FIG. 4B presents a flowchart illustrating a method of a host receiving an inter-VM packet from a remote host and providing the packet to a destination VM, in accordance with an embodiment of the present application.

FIG. 4B presents a flowchart illustrating a method of a host receiving an inter-VM packet from a remote host and providing the packet to a destination VM, in accordance with an embodiment of the present application. During operation, the host can receive a packet from a remote VM on a remote host via a locally coupled switch in the underlay network (operation 452). The host can then obtain source and destination IP addresses in the layer-3 header of the packet (operation 454). The packet can be a modified packet sent from the source host. Therefore, the host can determine the source and destination IP addresses as transit IP addresses associated with the source and destination VMs, respectively (operation 456). Here, the source VM can be a remote VM executing on another host, and the destination VM can be a local VM running on the local host.

The host can then look up the transit IP addresses in the transit data structure to determine the IP and MAC addresses associated with source and destination VMs (operation 458). The host can then replace the source and destination IP addresses in the layer-3 header of the packet with IP addresses associated with source and destination VMs, respectively (operation 460). The host can also replace the source and destination MAC addresses in the layer-2 header of the packet with MAC addresses associated with source and destination VMs, respectively (operation 462). In this way, the host can reconstruct the original packet using the information obtained from the transit data structure. Subsequently, the host can provide the packet to the destination VM associated with the destination address(es) (operation 464).

Exemplary Computer System and Apparatus

Figure 5:
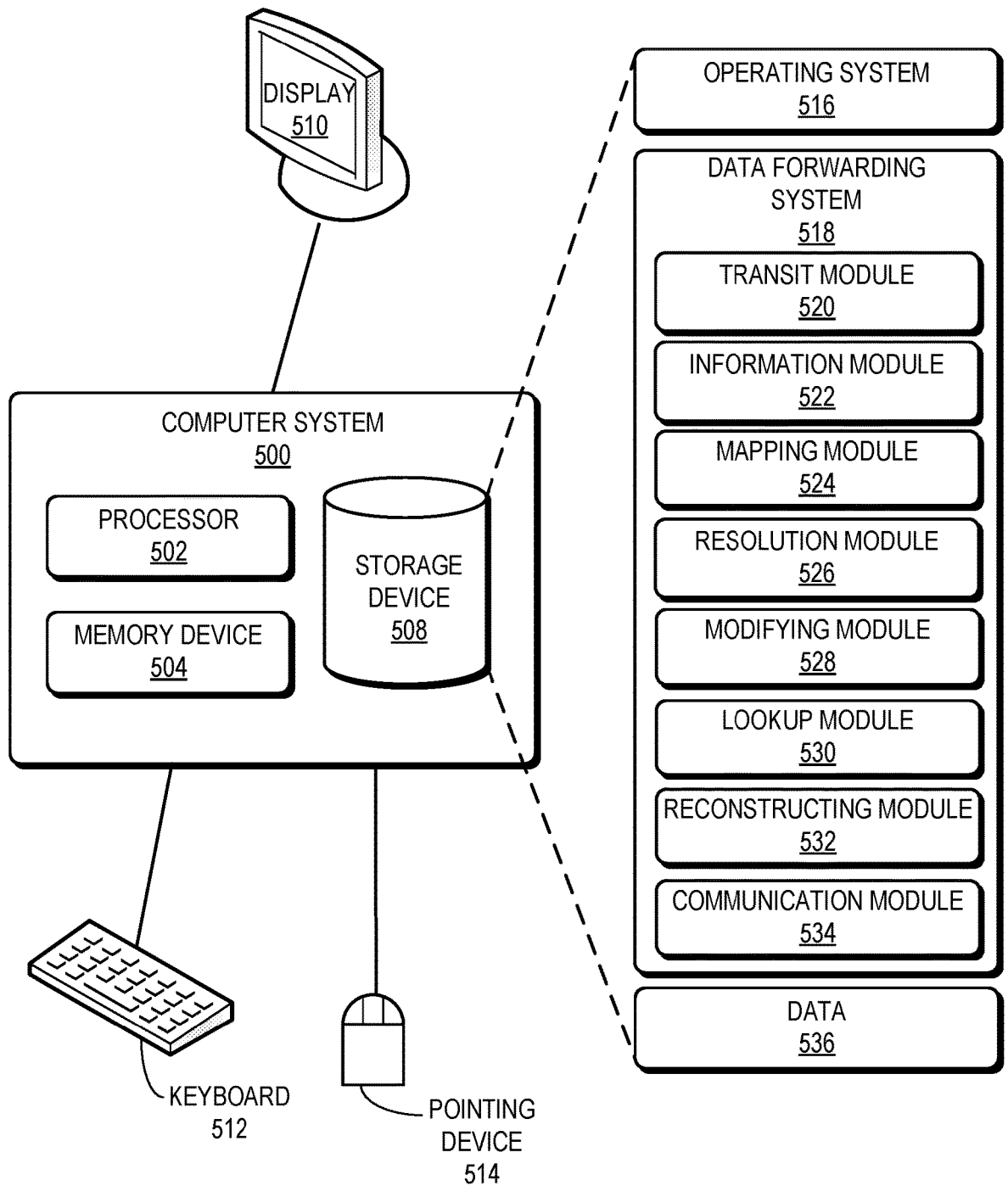
FIG. 5 illustrates an exemplary computer system that facilitates efficient layer-2 forwarding of inter-VM traffic, in accordance with an embodiment of the present application.

FIG. 5 illustrates an exemplary computer system that facilitates efficient layer-2 forwarding of inter-VM traffic, in accordance with an embodiment of the present application. Computer system 500 includes a processor 502, a memory 504, and a storage device 508. Memory 504 can include a volatile memory (e.g., a dual in-line memory module (DIMM)). Furthermore, computer system 500 can be coupled to a display device 510, a keyboard 512, and a pointing device 514. Storage device 508 can store an operating system 516, a data forwarding system 518, and data 536.

Data forwarding system 518 can include instructions, which, when executed by computer system 500, can cause computer system 500 to perform methods and/or processes described in this disclosure. Specifically, Data forwarding system 518 can include instructions for allocating a transit IP address to a VM (transit module 520). Data forwarding system 518 can also include instructions for obtaining information associated with a VM from a management system (e.g., an SDN controller) (information module 522). Data forwarding system 518 can also include instructions for mapping the information associated with a VM to the transit IP address of the VM (mapping module 524).

In addition, data forwarding system 518 can include instructions for locally resolving ARP requests by providing corresponding ARP responses to the requesting VM (resolution module 526). Furthermore, data forwarding system 518 can include instructions for replacing (or rewriting) the source and destination MAC addresses of a layer-2 header of a packet received from a local VM with MAC addresses of source and destination hosts, respectively (identifier module 528). Moreover, data forwarding system 518 can include instructions for replacing (or rewriting) the source and destination IP addresses of a layer-3 header of the packet with transit IP addresses of source and destination VMs, respectively (modifying module 528).

Data forwarding system 518 can also include instructions for looking up a transit IP address in a transit data structure to obtain information associated with the corresponding VM (lookup module 530). Data forwarding system 518 can also include instructions for reconstructing a modified packet received from a remote host (reconstructing module 532). The reconstruction can include replacing the host MAC addresses and transit IP addresses with corresponding original addresses. Data forwarding system 518 can also include instructions for sending and receiving layer-2 and/or layer-3 packets (communication module 534).

Data 536 can include any data that is required as input, or that is generated as output by the methods and/or processes described in this disclosure. Specifically, data 536 can store at least: a transit data structure, flow rules for modifying a packet, flow rules for reconstructing a modified packet, and flow rules for providing an ARP response to a local VM.

Figure 6:
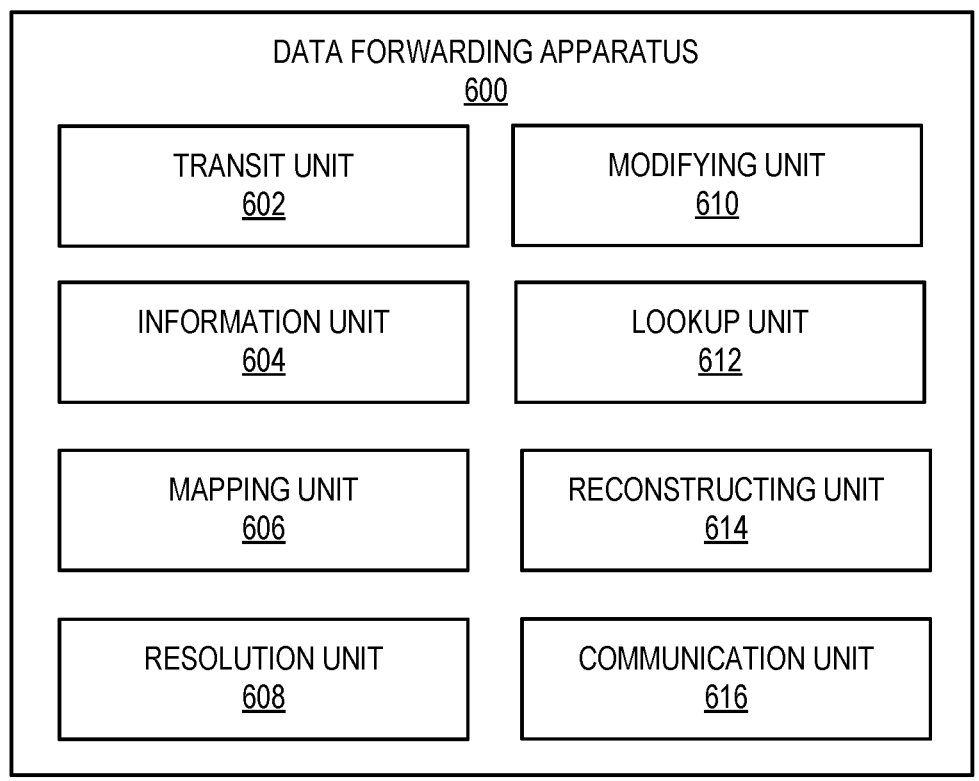
FIG. 6 illustrates an exemplary apparatus that facilitates efficient layer-2 forwarding of inter-VM traffic, in accordance with an embodiment of the present application.

FIG. 6 illustrates an exemplary apparatus that facilitates efficient layer-2 forwarding of inter-VM traffic, in accordance with an embodiment of the present application. Apparatus 600 can comprise a plurality of units or apparatuses that may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Apparatus 600 may also be a virtual device (e.g., a VM, a hypervisor, etc.).

Specifically, apparatus 600 can comprise units 602-616, which perform functions or operations similar to modules 520-534 of computer system 500 of FIG. 5, including: a transit unit 602; an information unit 604; a mapping unit 606; a resolution unit 608; a modifying unit 610; a lookup unit 612; a reconstructing unit 614; and a communication unit 616.

Note that the above-mentioned modules can be implemented in hardware as well as in software. In one embodiment, these modules can be embodied in computer-executable instructions stored in a memory which is coupled to one or more processors in computer system 500 and/or apparatus 600. When executed, these instructions cause the processor(s) to perform the aforementioned functions.

In summary, embodiments of the present invention provide a system and a method that enable efficient inter-VM traffic forwarding. In one embodiment, a computing system can determine that a packet is from a first VM running on the computing system and destined to a second VM running on a second computing system. The computing system can then determine a first transit Internet Protocol (IP) address of a first VM and a second transit IP address of the second VM. Here, a transit IP address of a respective VM is distinct from a primary IP address using which the VM participates in routing. The computing system can then modify a layer-2 header of the packet to replace source and destination MAC addresses in the layer-2 header with a first MAC address of the computing system and a second MAC address of the second computing system, respectively. The computing system can also modify the layer-3 header of the packet to replace the source and destination IP addresses in the layer-3 header of the packet with the first and second transit IP addresses, respectively. Subsequently, the computing system can determine an egress port corresponding to the second computing system based on the modified layer-2 header.

The methods and processes described herein can be embodied as code and/or data, which can be stored in a non-transitory computer-readable storage medium. When a computer system reads and executes the code and/or data stored on the non-transitory computer-readable storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   determining, by a computing system in a distributed system, that a packet is from a first virtual machine (VM) running on the computing system and destined to a second VM running on a second computing system;
   determining a first transit Internet Protocol (IP) address of a first VM and a second transit IP address of the second VM, wherein a transit IP address of a respective VM is distinct from a primary IP address using which the VM participates in routing;
   modifying a layer-2 header of the packet to replace source and destination media access control (MAC) addresses in the layer-2 header with a first MAC address of the computing system and a second MAC address of the second computing system, respectively;
   modifying a layer-3 header of the packet to replace source and destination IP addresses in the layer-3 header of the packet with the first and second transit IP addresses, respectively; and
   determining, for the packet, an egress port corresponding to the second computing system based on the modified layer-2 header.

2. The method of claim 1, further comprising:
   mapping, at the computing system, the first transit IP address to IP and MAC addresses of a first VM; and
   mapping, at the computing system, the second transit IP address to IP and MAC addresses of a second VM.

3. The method of claim 2, wherein the first and second VMs belong to a virtual private cloud (VPC) in the distributed system, and wherein the IP addresses of the first and second VMs are allocated from a first IP address space associated with the VPC.

4. The method of claim 3, wherein the first and second transit IP addresses are allocated from a second IP address space spanning a respective VPC in the distributed system, and wherein the second IP address space is distinct from the first IP address space.

5. The method of claim 1, wherein the computing system and the second computing system are in a same layer-2 forwarding domain.

6. The method of claim 1, further comprising:
receiving, from a management device, one or more flow rules instructing the computing system to modify layer-2 and layer-3 headers of an inter-VM packet; and
programming the one or more flow rules at the computing system.

7. The method of claim 6, further comprising receiving, from the management device, information indicating allocation of the first and second transit IP addresses to the first and second VMs, respectively.

8. The method of claim 1, further comprising:
receiving, from the first VM, an address resolution protocol (ARP) request for an IP address of the second VM;
generating an ARP response comprising a MAC address of the second VM from within the computing system; and
providing the ARP response to the first VM.

9. A method, comprising:
determining, by a computing system of a distributed system running a first virtual machine (VM), that a packet is received from a second VM running on a second computing system;
obtaining a first transit Internet Protocol (IP) address of the first VM and a second transit IP address of the second VM from a layer-3 header of the packet, wherein a transit IP address of a respective VM is distinct from a primary IP address using which the VM participates in routing;
obtaining a first primary IP address and a first media access control (MAC) address of the first VM based on the first transit IP address;
obtaining a second primary IP address and a second MAC address of the second VM based on the second transit IP address;
modifying the packet to replace destination and source MAC addresses in a layer-2 header with the first and second MAC addresses, respectively;
modifying the packet to replace destination and source IP addresses in the layer-3 header with the first and second primary IP addresses, respectively; and
providing the modified packet to the second VM.

10. The method of claim 9, further comprising:
mapping, at the computing system, the first transit IP address to the first primary IP address and the first MAC address; and
mapping, at the computing system, the second transit IP address to the second primary IP address and the second MAC address.

11. The method of claim 10, wherein the first and second VMs belong to a virtual private cloud (VPC) in the distributed system, and wherein the first and second primary IP addresses are allocated from a first IP address space associated with the VPC.

12. The method of claim 11, wherein the first and second transit IP addresses are allocated from a second IP address space spanning a respective VPC in the distributed system, and wherein the second IP address space is distinct from the first IP address space.

13. The method of claim 9, wherein the computing system and the second computing system are in a same layer-2 forwarding domain.

14. The method of claim 9, further comprising:
receiving, from a management device, one or more flow rules instructing the computing system to modify layer-2 and layer-3 headers of an ingress inter-VM packet; and
programming the one or more flow rules at the computing system.

15. The method of claim 14, further comprising receiving, from the management device, information indicating allocation of the first and second transit IP addresses to the first and second VMs, respectively.

16. The method of claim 9, further comprising:
receiving, from the first VM, an address resolution protocol (ARP) request for an IP address of the second VM;
generating an ARP response comprising a MAC address of the second VM from within the computing system; and
providing the ARP response to the first VM.

17. A computing system, comprising:
a processor; and
a memory coupled to the processor and storing instructions, which when executed by the processor cause the processor to perform a method, the method comprising:
determining that a packet is from a first virtual machine (VM) running on the computing system and destined to a second VM running on a second computing system;
determining a first transit Internet Protocol (IP) address of a first VM and a second transit IP address of the second VM, wherein a transit IP address of a respective VM is distinct from a primary IP address using which the VM participates in routing;
modifying a layer-2 header of the packet to replace source and destination media access control (MAC) addresses in the layer-2 header with a first MAC address of the computing system and a second MAC address of the second computing system, respectively;
modifying a layer-3 header of the packet to replace source and destination IP addresses in the layer-3 header of the packet with the first and second transit IP addresses, respectively; and
determining, for the packet, an egress port corresponding to the second computing system based on the modified layer-2 header.

18. The computing system of claim 17, wherein the first and second VMs belong to a virtual private cloud (VPC) in the distributed system, and wherein the first and second primary IP addresses are allocated from a first IP address space associated with the VPC.

19. The computing system of claim 18, wherein the first and second transit IP addresses are allocated from a second IP address space spanning a respective VPC, and wherein the second IP address space is distinct from the first IP address space.

20. The computing system of claim 17, wherein the computing system resides in a same layer-2 forwarding domain as the second computing system.

* * * * *